United States Patent
Saletta et al.

(10) Patent No.: US 12,421,920 B1
(45) Date of Patent: Sep. 23, 2025

(54) MULTI-MODE ROCKET-BASED COMBINED CYCLE

(71) Applicant: VENUS AEROSPACE CORP, Houston, TX (US)

(72) Inventors: Ben Saletta, Houston, TX (US); Andrew Thomas Duggleby, Houston, TX (US)

(73) Assignee: VENUS AEROSPACE CORP, Houston, TX (US)

( * ) Notice: Subject to any disclaimer, the term of this patent is extended or adjusted under 35 U.S.C. 154(b) by 0 days.

(21) Appl. No.: 18/786,333

(22) Filed: Jul. 26, 2024

(51) Int. Cl.
*F02K 7/18* (2006.01)
*F02K 7/12* (2006.01)
*F02K 9/78* (2006.01)

(52) U.S. Cl.
CPC ............... *F02K 7/18* (2013.01); *F02K 7/12* (2013.01); *F02K 9/78* (2013.01)

(58) Field of Classification Search
CPC ............... F02K 7/18; F02K 9/78; F02K 7/12
See application file for complete search history.

(56) References Cited

U.S. PATENT DOCUMENTS

| | | | | |
|---|---|---|---|---|
| 2,999,672 A | * | 9/1961 | Harshman | F02K 7/16 60/264 |
| 3,841,090 A | * | 10/1974 | Sharpe | F02K 7/12 60/39.52 |
| 5,224,344 A | * | 7/1993 | Keirsey | F02K 7/18 60/769 |
| 5,946,904 A | | 9/1999 | Boehnlein et al. | |
| 6,895,756 B2 | * | 5/2005 | Schmotolocha | F23R 3/22 60/749 |
| 8,256,203 B1 | * | 9/2012 | Blackmon | F02K 7/18 60/767 |
| 10,739,004 B2 | * | 8/2020 | Ueno | F02K 7/18 |
| 2020/0354070 A1 | * | 11/2020 | Himmelmann | F02K 7/14 |
| 2024/0125287 A1 | * | 4/2024 | Smith | F02K 9/52 |

FOREIGN PATENT DOCUMENTS

KR    10-2011-0072801    6/2011

* cited by examiner

Primary Examiner — Kyle Robert Thomas
(74) Attorney, Agent, or Firm — HAYES SOLOWAY P.C.

(57) ABSTRACT

An air breathing engine system has an engine inlet configured to receive a flow of air. A combustor is in fluid communication with the engine inlet. A rocket ejector is positioned between the engine inlet and combustor. The rocket ejector is connected to the combustor with a mixing tube. The rocket ejector adjustably outputs high-temperature gas into air in the mixing tube. The high-temperature gas changes a pressure and thermal energy of the air within the mixing tube, which can be used to optimize combustor operation, such as based on a trajectory, flight condition, or speed of an aircraft propelled by the air breathing engine system.

20 Claims, 9 Drawing Sheets

Variable Throat

MULTI-MODE ROCKET-BASED COMBINED CYCLE

TECHNICAL FIELD

The present disclosure relates to engines and, more particularly, relates to the use of a multi-mode rocket-based engine with a combined cycle.

BACKGROUND AND SUMMARY

This section provides background information related to the present disclosure which is not necessarily prior art. This section provides a general summary of the disclosure, and is not a comprehensive disclosure of its full scope or all of its features.

Ramjet engines are widely used in high-speed aircraft propulsion. Typically, ramjets operate by compressing incoming air through the engine inlet at supersonic speeds, utilizing the engine's forward motion to achieve compression rather than relying on mechanical compressors. This feature makes ramjets advantageous for high-speed applications, particularly in scenarios where traditional turbine engines may not be practical due to their weight, complexity, and mechanical limitations.

One significant limitation of conventional ramjet engines is their performance at lower speeds and during takeoff phases where sufficient air compression may not be achieved solely through forward motion. To overcome this limitation, various proposals have sought to use ejectors with ramjet engines, where the ejectors are relied on to supplement thrust at low speeds.

For example, U.S. Pat. No. 5,946,904 describes a combined cycle ramjet engine capable of operating across a wide range of speeds, from subsonic to hypersonic. This engine integrates a ramjet and a turbojet, utilizing a common inlet and exhaust nozzle to streamline airflow management, such that fuel efficiency and thrust generation can be optimized, thereby allowing the engine to transition between ramjet and turbojet modes.

In a similar manner, U.S. Pat. No. 8,256,203 describes a rocket based combined cycle (RBCC) propulsion unit which uses a rocket thruster integrated with a jet engine but is external to the flow path of the jet engine. Since the rocket thruster is external to such flow path, the rocket flow from the rocket thruster interacts with the jet flow from the jet engine aft of the nozzle of the jet engine. Such interaction occurs without a significant performance penalty in the operation of the jet engine and can solve some problems of conventional RBCC propulsion units.

Despite the current technology employing ejectors with ramjet engines, current high-speed, air breathing propulsion systems individually have limited flight regimes, i.e., different operational conditions and speeds encountered by an aircraft during flight. Turbine based systems are limited by inlet air temperature to below about Mach 2.5. Ramjet systems don't generate sufficient pressure and temperature to autoignite the fuel until near Mach 3.5, while scramjet systems don't generate the autoignition conditions until Mach 5 or greater. Thus, there is a need for a single engine architecture that is capable of providing sufficient thrust over all flight regimes in a compact package.

The present disclosure is directed to a combined cycle propulsion system, and in particular, to the use of an ejector with a ramjet engine. The ejector is positioned in the engine between the inlet and the combustor, and can provide required combustor pressures at low speeds for the engine to operate in different flight regimes. The disclosure permits the ramjet engine to start at much lower speeds than it would be able to in normal operation, and does so with high packaging efficiency. For instance, it may allow for a reduction of the starting Mach number of the ramjet engine. In one embodiment, the engine combines the use of the ejector and ramjet with a rotating detonation rocket engine (RDRE) which permits efficient operation across the full range of flight regimes, such as to optimize conditions in the combustor for variable trajectories and flight conditions.

Embodiments of the present disclosure provide an air breathing engine system. Briefly described, in architecture, one embodiment of the system, among others, can be implemented as follows. An engine inlet is configured to receive a flow of air. A combustor is in fluid communication with the engine inlet. A rocket ejector is positioned between the engine inlet and combustor. The rocket ejector is connected to the combustor with a mixing tube, wherein the rocket ejector is configured to adjustably output high-temperature gas into air in the mixing tube, wherein the high-temperature gas changes a pressure and thermal energy of the air within the mixing tube.

In one aspect, the rocket ejector further comprises at least one of: monopropellant ejector, a bi-propellant deflagration engine, a bi-propellant detonation engine, or a rotating detonation engine.

In this aspect, the rotating detonation engine is located between the engine inlet and the combustor.

In another aspect, the mixing tube has a first portion with a convergent cross section and a second portion with a divergent cross section, wherein the first portion is positioned between the rocket ejector and the second portion.

In yet another aspect, a cross section of the mixing tube is adjustable.

In still another aspect, a diffusing surface positioned proximate to an output of the mixing tube, wherein the diffusing surfaces diffuse fuel into the air.

In this aspect, a backwards-facing step may be formed in a sidewall proximate to the output of the mixing tube, wherein the backwards-facing step is configured to generate a vortex with the diffused fuel in the air.

In yet another aspect, an RDRE is positioned exterior to an exhaust bell of the combustor.

In still another aspect, a variable throat is connected to the combustor, wherein the variable throat controls combustor pressure.

In another aspect, a turbine is positioned exterior of the mixing tube, wherein a portion of the air is bled to the turbine to remove a boundary layer in the engine inlet.

The present disclosure can also be viewed as providing an air breathing, ramjet engine system for propelling a vehicle. Briefly described, in architecture, one embodiment of the system, among others, can be implemented as follows. An engine inlet is configured to receive a flow of air. A combustor is in fluid communication with the engine inlet. A rocket ejector is positioned between the engine inlet and combustor. The rocket ejector is connected to the combustor with a mixing tube, wherein the rocket ejector is configured to adjustably output high-temperature gas into air in the mixing tube, wherein the high-temperature gas changes a pressure and thermal energy of the air within the mixing tube. An RDRE is positioned exterior to an exhaust bell of the combustor.

In one aspect, a turbine is positioned exterior of the mixing tube, wherein a portion of the air is bled to the turbine to remove a boundary layer in the engine inlet.

The present disclosure can also be viewed as providing methods of operating an air breathing engine. In this regard, one embodiment of such a method, among others, can be broadly summarized by the following steps: generating a supersonic stream of high-temperature gas with a rocket ejector; mixing the high-temperature gas with a flow of air received in an engine inlet; adjusting the mixture of the high-temperature gas with the flow of air by controlling a chamber pressure of the rocket ejector, thereby optimizing at least one condition of a combustor; and propelling a vehicle.

In one aspect of this method, the vehicle further comprises an aircraft, whereby the at least one condition of the combustor is optimized based on at least one of: a trajectory of the aircraft, a flight condition of the aircraft, or a speed of the aircraft.

In this aspect, the speed of the aircraft is below Mach 3.

In another aspect of the method, mixing the high-temperature gas with the flow of air received in the engine inlet further comprises varying a cross section of a mixing tube where the high-temperature gas is mixed with the flow of air.

In yet another aspect of the method, fuel is diffused into the air with a diffusing surface positioned proximate to an inlet of the combustor, wherein the diffusing surfaces diffuse fuel into the air.

In still another aspect of the method, an RDRE is positioned exterior to an exhaust bell of the combustor to provide thrust at subsonic speeds and reduce pressure at the exhaust bell of the combustor.

In another aspect of the method, combustor pressure is controlled with a variable throat connected to the combustor.

In still another aspect of the method, a portion of the air is bled to a turbine, thereby removing a boundary layer in the engine inlet.

In this aspect, the portion of the air may be cooled with the turbine, whereby the air is then used for cooling at least one electronic device with the portion of the air, cooling the combustor with the portion of the air, and then injected into a bell expansion, thereby augmenting thrust.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Further features and advantages of the disclosure will be seen in the following detailed description, taken in conjunction with the accompanying drawings, wherein like numerals depict like parts. The drawings described herein are for illustrative purposes only of selected embodiments and not all possible implementations and are not intended to limit the scope of the present disclosure.

In the drawings.

DETAILED DESCRIPTION

Example embodiments will now be described more fully with reference to the accompanying drawings. Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, components, and/or groups, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers, and/or sections should not be limited by these terms. These terms may be only used to distinguish one element, component, region, layer or section from another element, component, region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein "vehicle" may comprise a land vehicle, a water vehicle, or an aircraft, or any combination thereof.

The use of a combined cycle propulsion system can enable a vehicle, such as an aircraft, to overcome current limitations with ramjet engines, and in particular, to permit the ramjet engine to start at much lower speeds than it would be able to in normal operation, and without inefficient operation. For instance, it may allow for a reduction of the starting Mach number of the ramjet engine, such that a single ramjet engine can provide useful thrust over all flight regimes, including at speeds below Mach 3, which is conventionally not possible. This can be achieved by combining the use of the ejector and ramjet, and optionally with an RDRE, which permits efficient operation across the full range of flight regimes, such as to optimize conditions in the combustor for variable trajectories and flight conditions.

Figure 1:
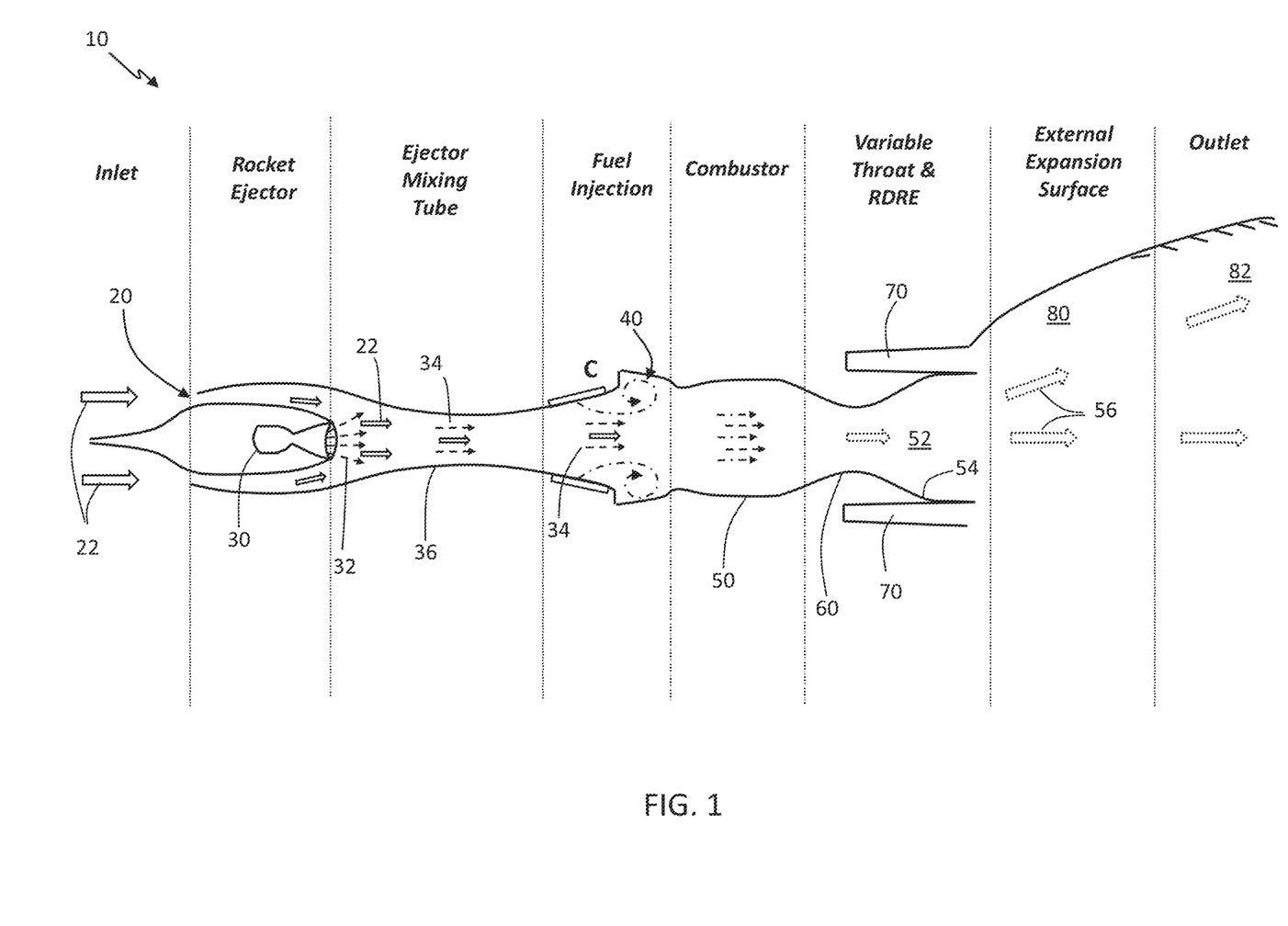
FIG. 1 is a cross-sectional view, diagrammatical illustration of an air breathing engine system, in accordance with the present disclosure.

FIG. 1 is a cross-sectional view, diagrammatical illustration of an air breathing engine system 10, in accordance with the present disclosure. The air breathing engine system 10, which may be referred to as 'system 10' has various critical components, stages, or systems which operate in sequence to provide thrust. As identified in FIG. 1, an engine inlet 20 is located on a forward edge of system 10, which is configured to receive or intake a flow of air 22 into the system 10, as indicated by arrows. The air is compressed by inlet spike and passes by a rocket ejector 30, which may be housed within inlet spike, and which produces a supersonic stream of high-temperature gas 32 which is injected into the flow of air 22 to create a mixed stream 34 within duct of ejector mixing tube 36. Ejector mixing tube 36 is located between engine inlet 20 and combustor 50, and it connects rocket ejector 30 to combustor 50, all of which are in fluid communication. Rocket ejector 30 is configured to adjustably output the high-temperature gas 32 into air 22 in ejector mixing tube 36. The high-temperature gas 32 changes the pressure and thermal energy of the air 22 within ejector mixing tube 36.

Before arriving at combustor 50, mixed stream 34 then passes to a fuel injection and flame holding stage, where fuel 40 is diffused into the mixed stream 34. The combined fuel 40 and mixed stream 34 enters combustor 50, and moves through a variable throat 60 at the combustor outlet 52. An RDRE 70 built around the exhaust bell 54 of combustor 50 may be used to provide thrust at subsonic speeds and at high altitudes where there is insufficient air for the ramjet to operate, and may reduce pressure at exhaust bell 54. The hot exhaust gas 56 from combustor 50 and RDRE 70 are then expanded at an external expansion surface 80 at the aft end of the vehicle, and exhausted at outlet 82. In a preferred embodiment, outlet 82 may be asymmetrical, as depicted in FIG. 1.

Rocket ejector 30 may be a rocket combustion device which is capable of producing a supersonic stream of high-temperature gas 32, thereby providing pressure and thermal energy to the flow of air 22 captured in the engine inlet 20. The high-temperature gas 32 is formed from exhaust products output from rocket ejector 30, where the static temperature of the exhaust is higher than the incoming flow of air 22. Rocket ejector 30 has a controllable chamber pressure that adjusts the stream of high-temperature gas 32, which is used to adjust the energy addition to the flow of air 22. In turn, this adjustment of the energy addition allows for optimization of conditions in combustor 50 for variable trajectories and flight conditions. It is primarily combustor pressure that limits ram jet operation, and secondarily combustor inlet temperature.

In system 10, at low speeds, such as below Mach 3, rocket ejector 30 can increase pressure within its chamber to increase the kinetic energy of the stream of high-temperature gas 32. The converging and diverging shape of the ejector mixing tube 36, as discussed below, turns this kinetic energy into static pressure. At higher speeds, such as above Mach 3, the total pressure of the flow of air 22 may be sufficient, and the pressure of rocket ejector 30 chamber can be decreased. Rocket ejector 30 serves to decouple the burner from engine inlet 20 isolator for a large range of flight conditions. It is noted that conventional ejector ramjet configurations use deflagration engines, typically combusting liquid H2 and O2, which suffer from heating concerns and acoustic instabilities during throttling. The rocket ejector 30 using a monopropellant configuration may eliminate these concerns.

The rocket ejector 30 may include a monopropellant engine, a bi-propellant deflagration engine, a bi-propellant detonation engine, or any combination thereof, depending on engine performance requirements. In some embodiments, a combination of rocket ejectors 30 could be used. For example, from Mach 0 to between Mach 1 and 2, a bi-propellant ejector may be optimal. Then, from the cutoff speed for the bi-propellant ejector to approximately Mach 3, a monopropellant ejector can be used, where temperature is lower and capability to throttle is higher. Throttling of a monopropellant ejector permits fine control of thrust. When rocket ejector 30 includes a monopropellant engine, a bi-propellant deflagration engine, or a bi-propellant detonation engine, it may utilize an appropriate fuel, such as peroxide, hydrazine, kerosene, LH2, methane, or any others.

Figure 2A:
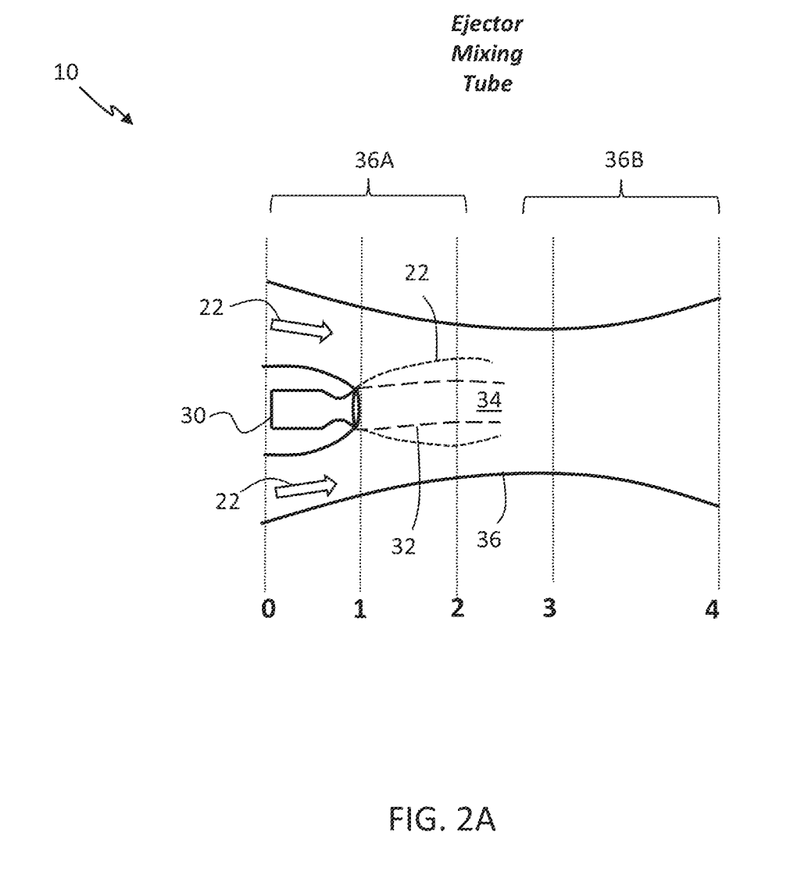
FIG. 2A is a cross-sectional view, schematic illustration of an ejector mixing tube of the air breathing engine system of FIG. 1, in accordance with the present disclosure.
Figure 2B:
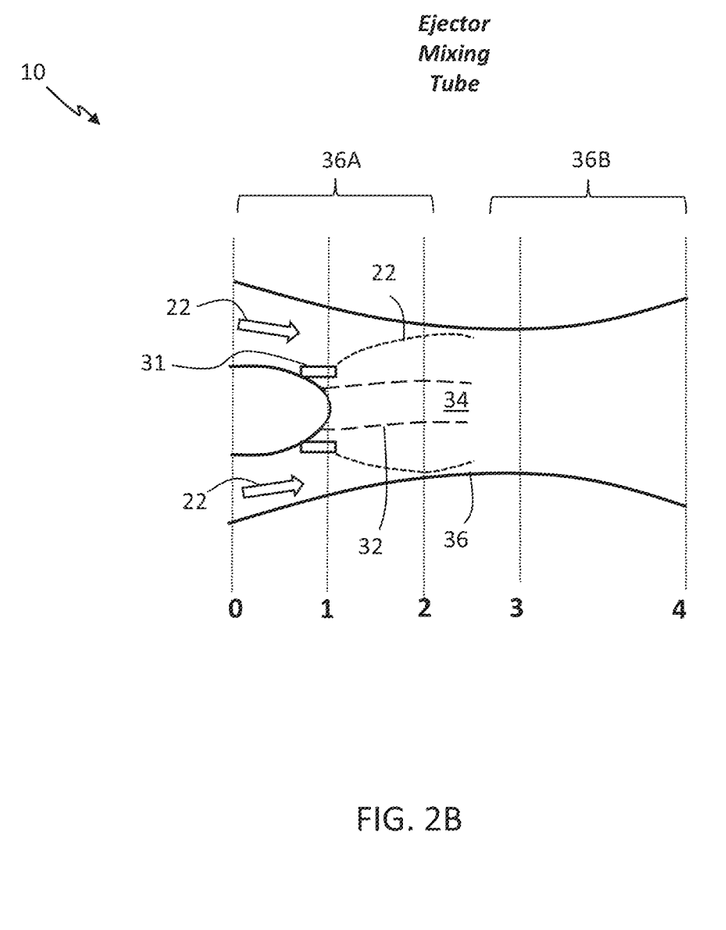
FIG. 2B is a cross-sectional view, schematic illustration of an ejector mixing tube of the air breathing engine system of FIG. 1, where the ejector is a rotating detonation engine, in accordance with the present disclosure.

The stream of high-temperature gas 32 and flow of air 22 is mixed in the ejector mixing tube 40, which is described in greater detail relative to FIGS. 2A-2B. With reference to FIGS. 1-2B together, the flow of air 22 at engine inlet 20 passes rocket ejector at a location before point 1 in FIGS. 2A-2B, and this secondary flow of air 22 from the engine inlet 20 is mixed with the stream of high-temperature gas 32 in ejector mixing tube 36 to produce mixed stream 34.

Ejector mixing tube 36 may be formed as a converging then diverging duct, such that it has a first portion 36A with a convergent cross section and a second portion 36B with a divergent cross section which acts as a subsonic diffuser. The converging first portion 36A is positioned forward of the diverging second portion 36B, such that it is positioned between rocket ejector 30 and the second portion 36B.

The use of the converging then diverging duct of ejector mixing tube 36 adjusts the area of ejector mixing tube 36, which can be used to adjust acceleration and pressure of the mixed stream 34. For instance, at point 1 of FIGS. 2A-2B, the primary flow of air 22 takes up approximately 2.5% of the total flow area. The duct of ejector mixing tube 36 converges between points 1 and 2, reducing total area by approximately 30% as the secondary flow of high-temperature gas 32 accelerates the mixed stream 34 to maintain a constant static pressure. The area reduction is applied such that the secondary flow of high-temperature gas 32 is accelerated at a constant rate. Point 2 represents this constant rate of momentum change in the ejector mixing tube 36, while conventional ejector ramjet designs utilize a constant area mixing duct for the ejectors. Point 3 holds a weak normal shock as the total flow becomes subsonic. Between points 3 and 4, there is an area expansion of 300% in the diverging second portion 36B, which increases the static pressure and reduces the burner entry Mach number below 0.3 for fuel injection and subsequent burning.

It is noted that FIG. 2B depicts an embodiment where rocket ejector 30 is a rotating detonation engine (RDE) 31, which may also be referred as a Rotating Detonation Rocket Engine (RDRE). The RDE 31 can switch between bi-propellant fuels and monopropellant fuel. When using a monopropellant, the RDE 31 as rocket ejector 30 results in a lower pressure rise and lower temperature products, resulting in a higher specific impulse. In some embodiments, a single RDE 31 or RDRE may be located between the air inlet 20 and the combustion chamber 50, allowing it to serve as a higher thrust ejector system. The use of the RDE 31 as rocket ejector 30 that can switch to monopropellant fuels may provide the system 10 with beneficial multi-mode abilities, which provides significant performance improvements over conventional systems.

Figure 3A:
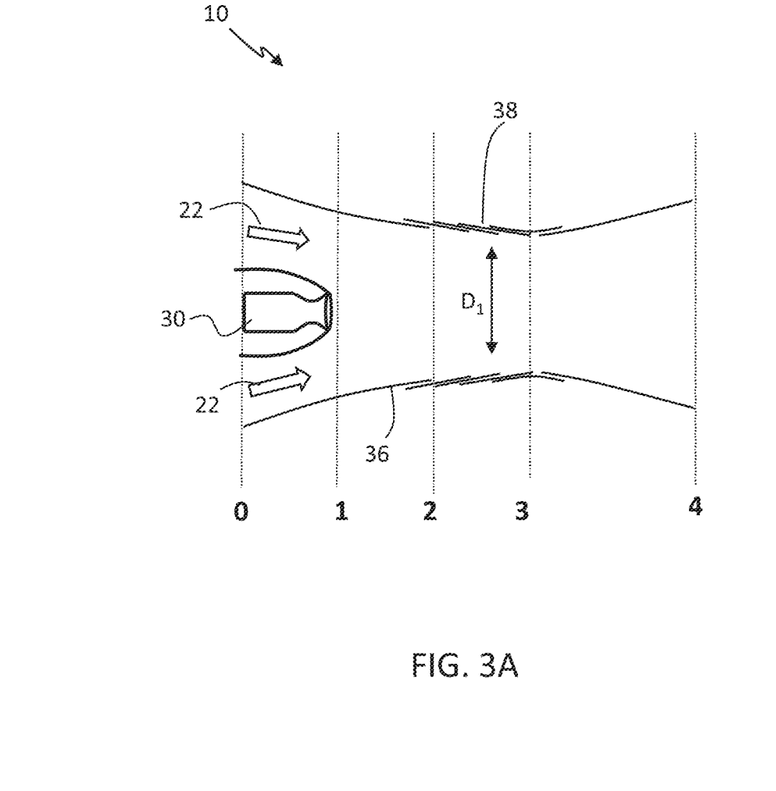
FIGS. 3A-3B are cross-sectional views, schematic illustrations of a variable ejector mixing tube of the air breathing engine system of FIG. 1, in accordance with the present disclosure.
Figure 3B:
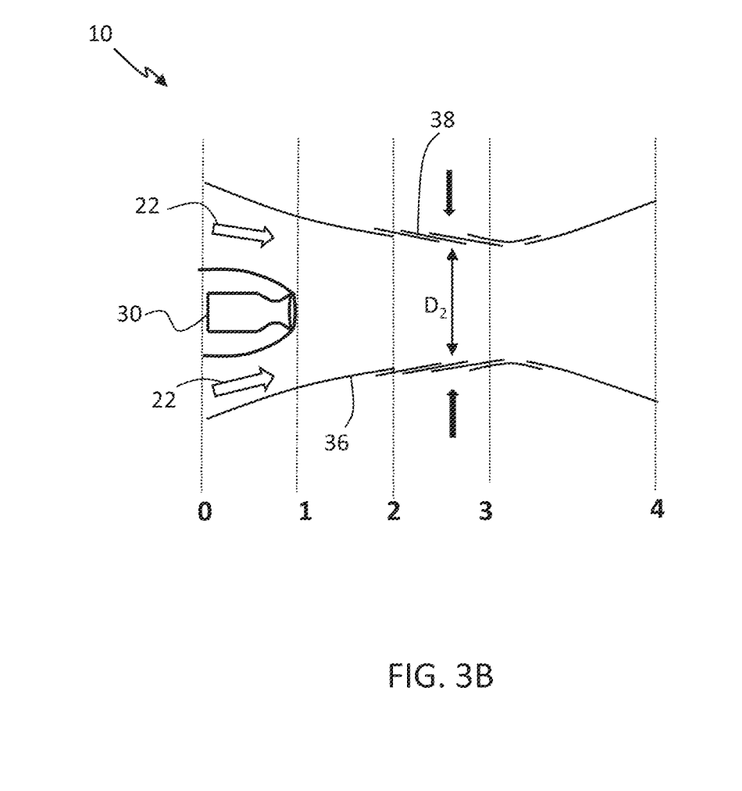

In some cases, it may be possible to vary the geometry of the duct of ejector mixing tube 36 in order to modify the throat area of ejector mixing tube 36. FIGS. 3A-3B are a cross-sectional views, schematic illustrations of a variable ejector mixing tube 36 of the air breathing engine system 10 of FIG. 1, in accordance with the present disclosure. As shown, a mechanical device 38 may be positioned on or along the sidewall of ejector mixing tube 36, and can be activated to adjust the cross-sectional area of the throat of ejector mixing tube 36, such as by decreasing or increasing a cross-sectional area at this location, which can be used to modify mass flow and adjust shock position. The mechanical device 38 may include an iris with overlapping pedals, or another type of device capable of adjusting the throat area, which can be actuated to achieve a change in diameter of the throat area of the ejector mixing tube 36. For instance, in FIG. 3A, the diameter $D_1$ is larger, whereas in FIG. 3B, the mechanical device 38 has been activated to decrease the diameter to $D_2$. This ability to vary the geometry of ejector mixing tube 36 provides another mechanism to control the normal shock strength in the duct, in addition to rocket ejector 30, but without requiring throttling the engine thrust.

Figure 4:
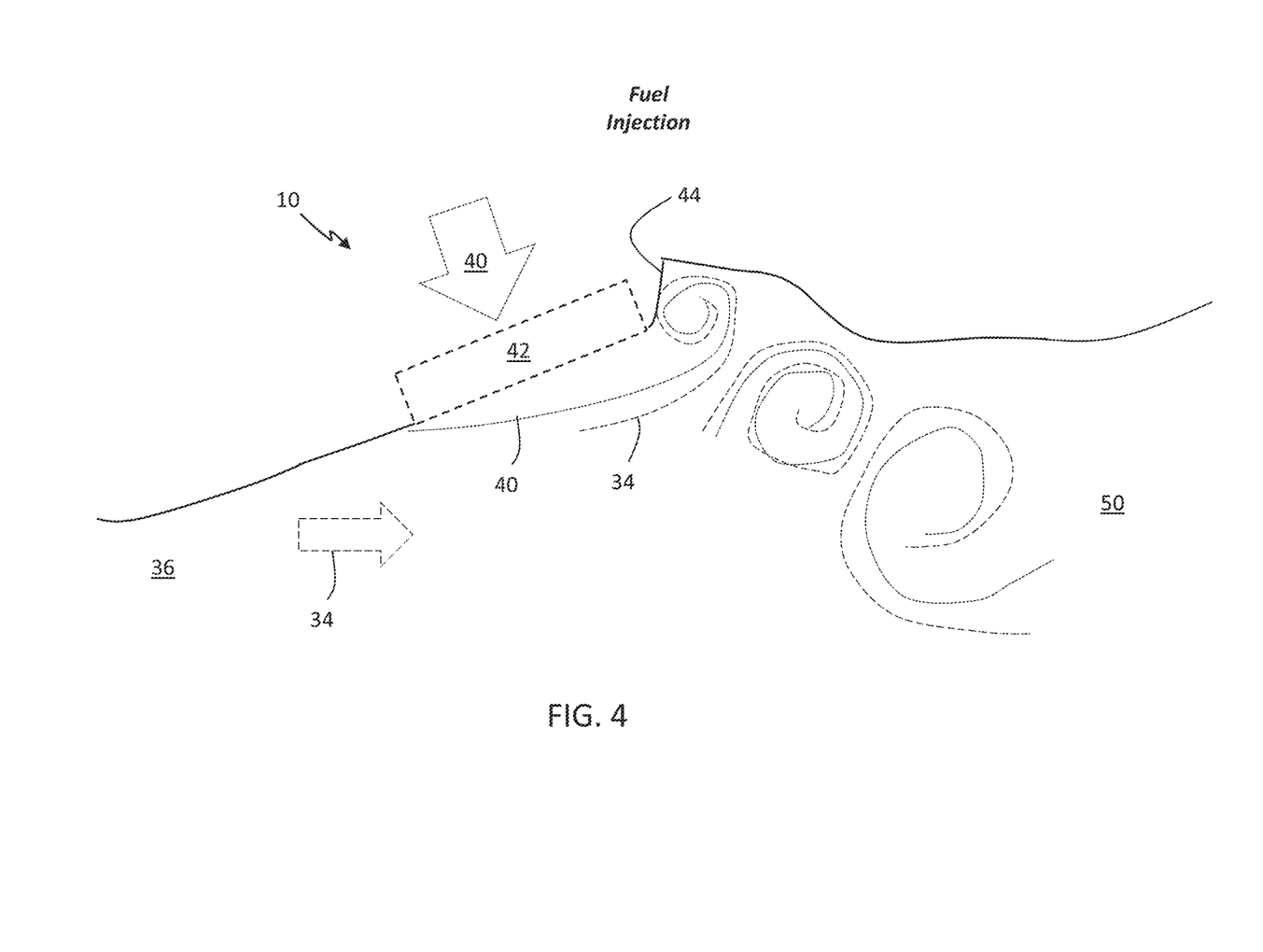
FIG. 4 is a cross-sectional view, schematic illustration of fuel injection and flame holding used with the air breathing engine system of FIG. 1, in accordance with the present disclosure.

The fuel injection and flame holding area is described relative to FIG. 4. The mixed stream 34 is received from the outlet of ejector mixing tube 36 where it is injected with fuel 40. The fuel 40 may be pumped from fuel tanks or other vessels, and passes through a diffusing surface 42, which may be formed as a low-density 3D printed surface that diffuses fuel 40 into the subsonic mixed stream 34 at an inlet of combustor 50. A backwards-facing step 44 formed in a sidewall proximate to the output of the ejector mixing tube 36 generates a vortex that kicks this fuel rich boundary layer into the free mixed stream 34 while maintaining a flame. This provides small droplet sizes that diffuse rapidly into the incoming mixed stream 34 while only minimally disturbing the overall flow. A benefit of this design is that the need for higher drag chevron style flame holders, typically used in ramjets and scramjets, is eliminated.

Figure 5A:
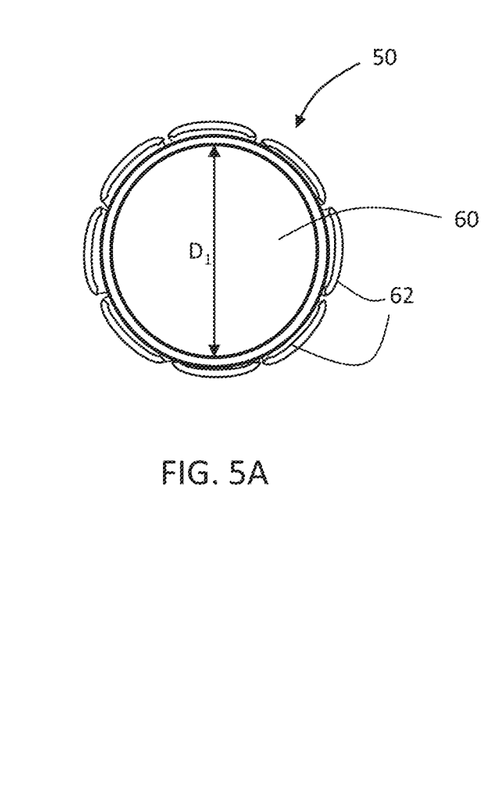
FIGS. 5A-5B are schematic illustrations of a variable throat of a combustor used with the air breathing engine system of FIG. 1, in accordance with the present disclosure.
Figure 5B:
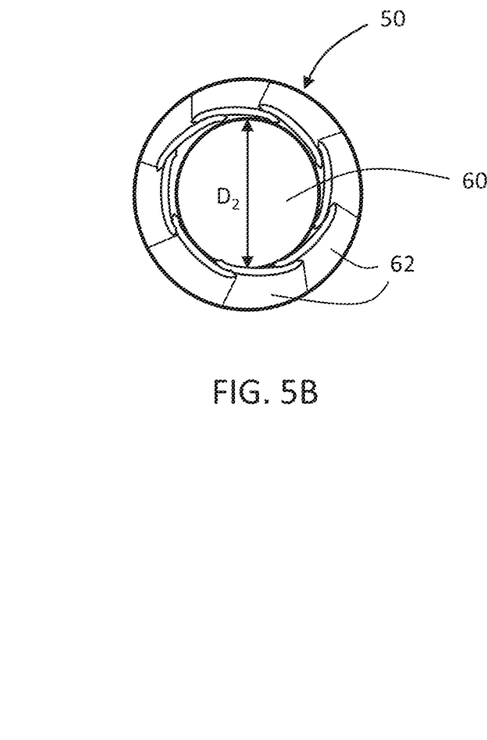

It is noted that combustor 50 pressure can be controlled with a variable throat. FIGS. 5A-5B are schematic illustrations of the variable throat 60 of combustor 50. As shown, a cross section of variable throat 60 may be controlled with a device, such as an iris and petal system 62, such as those used on modern fighter jets, where the iris and petal system 62 has a first position shown in FIG. 5A where the pedals are expanded to provide for a greater diameter, $D_1$, of variable throat 60, but can be contracted as shown in FIG. 5B to provide for a smaller diameter, $D_2$, of variable throat 60. As flight speeds increase the variable throat 60 may be opened all the way and heat is added until a thermal throat appears. At high flight speeds, combustor 50 pressure is controlled by the amount of heat addition.

With reference to FIG. 1, a high-thrust RDRE 70 may be built around the exhaust bell 54 of combustor 50. The RDRE 70 may provide thrust at subsonic speeds as well as high altitudes, and may reduce the pressure at the exhaust bell 54 of combustor 50, which allows the system 10 to generate meaningful thrust at lower flight speeds than would otherwise be possible. It is noted that RDRE 70 has a shorter chamber length and is intrinsically annular allowing for efficient packaging. Use of the RDRE 70 may be optional, but it may provide an expanded operational envelope to include shorter takeoff distances and higher altitudes.

The mixing RDRE 70 and combustor 50 exhaust are expanded further against the external expansion surface 80 at the aft end of the vehicle, in a configuration similar to a single expansion ramp nozzle, and exhausted at outlet 82.

Figure 6:
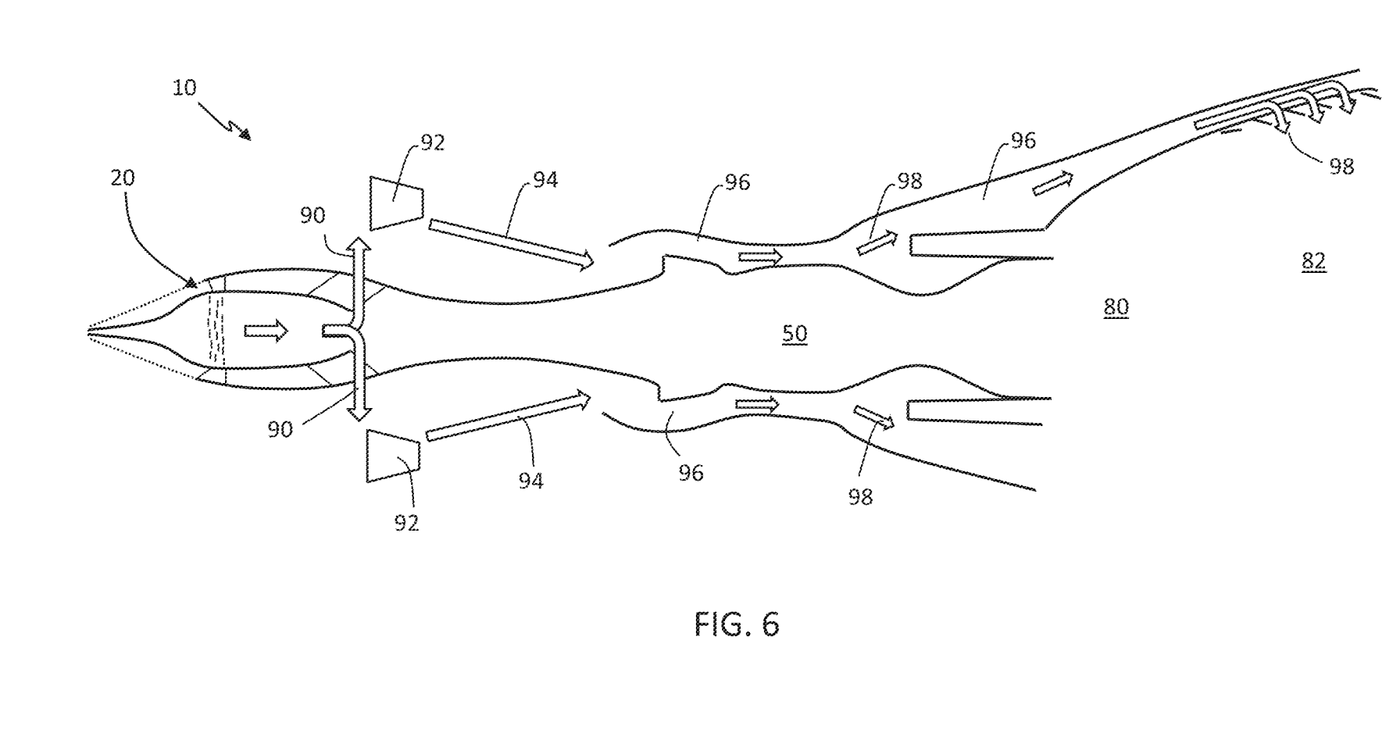
FIG. 6 is a cross-sectional view, schematic illustration of bleed injection used with the air breathing engine system of FIG. 1, in accordance with the present disclosure.

FIG. 6 is a cross-sectional view, schematic illustration of bleed injection used with the air breathing engine system 10 of FIG. 1, in accordance with the present disclosure. At supersonic speeds, the boundary layer in the engine inlet 20 needs to be removed to prevent shock wave boundary layer interactions that reduce performance and can eventually lead to an inlet unstart. This bleed air 90 is at high pressure and temperature, so is expanded across a bleed air turbine 92 to extract energy, which results in cooler bleed air 94. This cooler bleed air 94 is passed through a combustor cooling passage 96 where it can be optionally repurposed, such as used to cool other components of the system 10 or a vehicle on which the system 10 is used. It is noted that there may be an efficiency benefit of repurposing the bleed air instead of dumping it overboard. For example, it may first be used to cool onboard electronics, then cool combustor 50. This results in the cooler bleed air 94 increasing in temperature, such that this now hot bleed air 98 is injected into the external expansion surface 80 and through outlet 82, which can be used to augment thrust. While air cooling may aid in cooling the combustor 50, additional cooling may also be used, such as fuel cooling.

Figure 7:
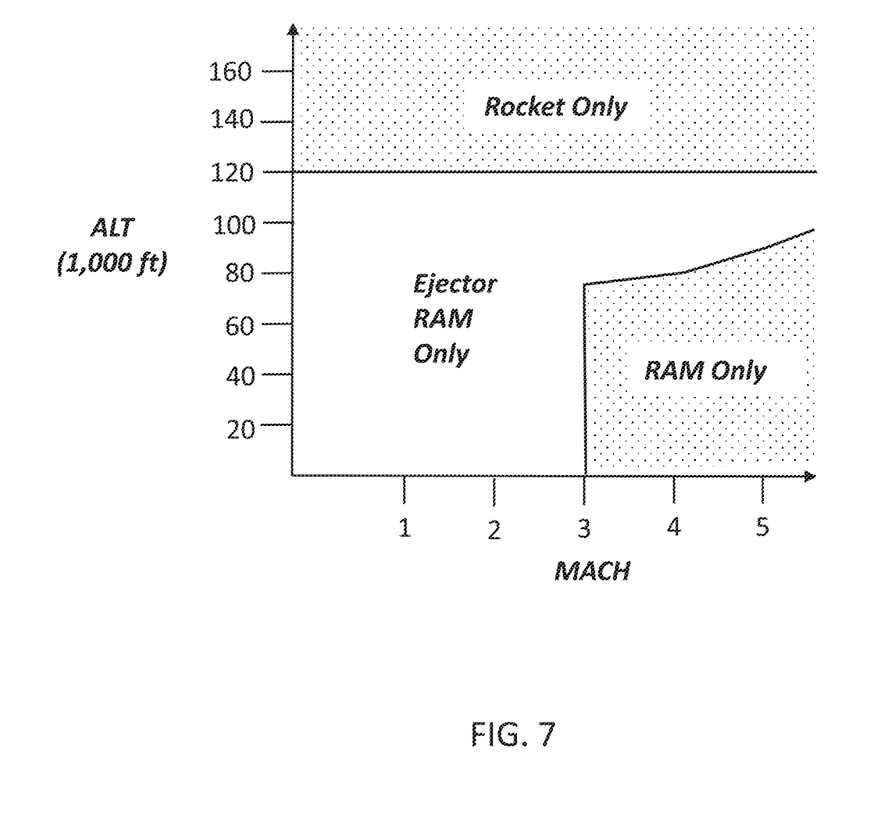
FIG. 7 is a graph plotting use of the air breathing engine system of FIG. 1 relative to altitude and speed, in accordance with the present disclosure.

FIG. 7 is a graph plotting use of the air breathing engine system of FIG. 1 relative to altitude (1,000 of feet) and speed (Mach), in accordance with the present disclosure, which provides an example of operation configuration relative to approximate flight conditions. As shown, the combination of engine cycles allows for any combination of Mach number or altitude to be flown by the system 10 allowing a wide variety of vehicle or mission applications. For instance, unlike conventional ejector ramjet engines, the system 10 can operate at speeds under Mach 3 and at altitudes between sea level and 120,000 feet. Conventional ejector ramjet engines are typically only functional at speeds above March 3.

Figure 8:
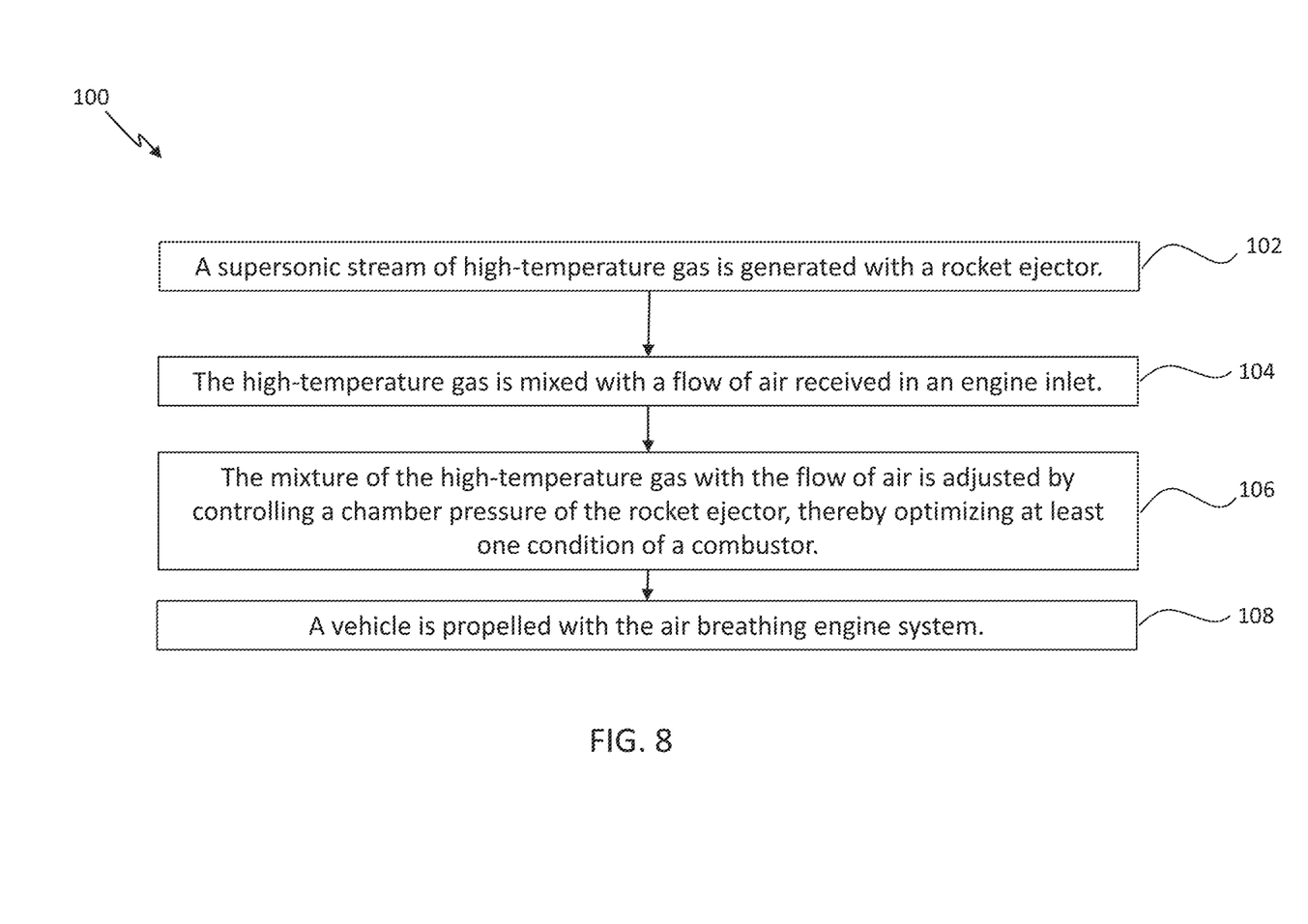
FIG. 8 is a flowchart illustrating a method of operating an air breathing engine system, in accordance with the present disclosure.

FIG. 8 is a flowchart illustrating a method 100 of operating an air breathing engine system, in accordance with the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, a supersonic stream of high-temperature gas is generated with a rocket ejector. The high-temperature gas is mixed with a flow of air received in an engine inlet (block 104). The mixture of the high-temperature gas with the flow of air is adjusted by controlling a chamber pressure of the rocket ejector, thereby optimizing at least one condition of a combustor (block 106). A vehicle is propelled with the air breathing engine system (block 108).

Any number of additional steps, functions, processes, or variants thereof may be included in the method, including any disclosed relative to any other figure of this disclosure. For example, the vehicle may comprise an aircraft, whereby the at least one condition of the combustor is optimized based on at least one of: a trajectory of the aircraft, a flight condition of the aircraft, or a speed of the aircraft. In one example, the condition of the combustor is optimized such that the air breathing engine system can propel the aircraft at a speed below Mach 3.

In other examples, mixing the high-temperature gas with the flow of air received in the engine inlet further comprises varying a cross section of a mixing tube, e.g., at a throat of the duct, where the high-temperature gas is mixed with the flow of air. This may provide another mechanism to control the normal shock strength in the duct of the mixing tube, in addition to the rocket ejector, but without requiring throttling the engine thrust.

In another example, fuel may be diffused into the air with a diffusing surface positioned proximate to an inlet of the combustor. The injected fuel, in combination with a backward facing step in the housing of the combustor, may generate a vortex that biases this fuel rich boundary layer into the free stream received from the mixing tube while maintaining a flame. This provides small droplet sizes that diffuse rapidly into the incoming air stream while only minimally disturbing the overall flow. Additionally, combustor pressure may be controlled with a variable throat connected to the combustor.

An RDRE may be positioned exterior to an exhaust bell of the combustor. The RDRE provides thrust at subsonic speeds and reduces a pressure at the exhaust bell of the combustor. This may allow for an expanded operational envelope, which may include shorter takeoff distances and higher altitudes.

In another example, a portion of the air from the rocket ejector or mixing tube may be bled to a turbine, thereby removing a boundary layer in the engine inlet. Once at the turbine, the air may be cooled, and then used for cooling an electronic device and/or the combustor. The now heated air can then be injected into a bell expansion, thereby augmenting thrust.

Various changes may be made in the above disclosure without departing from the spirit and scope thereof.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Various changes and advantages may be made in the above disclosure without departing from the spirit and scope thereof.

LIST OF REFERENCES

10 air breathing engine system
20 engine inlet
22 flow of air
30 rocket ejector
31 rotating detonation engine (RDE)
32 high-temperature gas
34 mixed stream
36 ejector mixing tube
36A converging first portion
36B diverging second portion
38 mechanical device
40 fuel
42 diffusing surface
44 backwards-facing step
50 combustor
52 combustor outlet
54 exhaust bell
56 hot exhaust gas
60 variable throat
62 iris and petal system
70 rotating detonation rocket engine (RDRE)
80 external expansion surface
82 outlet
90 bleed air
92 bleed air turbine
94 cooler bleed air
96 combustor cooling passage
98 hot bleed air

What is claimed:
1. A combined cycle propulsion system comprising:
a jet engine and a rocket engine;
an air inlet configured to receive a flow of air;
a combustor in fluid communication with the air inlet; and
a rocket ejector comprising the rocket engine positioned between the air inlet and combustor, the rocket ejector connected to the combustor with a mixing tube, wherein the rocket ejector is configured to adjustably output high-temperature gas into air in the mixing tube, wherein the high-temperature gas changes a pressure and thermal energy of the air within the mixing tube; and a rotating detonation rocket engine (RDRE) positioned exterior to an exhaust bell of the combustor and in fluid communication with the exhaust bell.

2. The combined cycle propulsion system of claim 1, wherein the rocket ejector further comprises at least one of: monopropellant ejector, a bi-propellant deflagration engine, a bi-propellant detonation engine, or an RDRE.

3. The combined cycle propulsion system of claim 1, wherein the mixing tube has a first portion with a convergent cross section and a second portion with a divergent cross section, wherein the first portion is positioned between the rocket ejector and the second portion.

4. The combined cycle propulsion system of claim 1, wherein a cross section of the mixing tube is adjustable.

5. The combined cycle propulsion system of claim 1, further comprising a diffusing surface positioned proximate to an output of the mixing tube, wherein the diffusing surface is configured to diffuse fuel into the air.

6. The combined cycle propulsion system of claim 5, further comprising a backwards-facing step formed in a sidewall proximate to the output of the mixing tube, wherein the backwards-facing step is configured to generate a vortex with the diffused fuel in the air.

7. The combined cycle propulsion system of claim 1, further comprising a variable throat connected to the combustor, wherein the variable throat is configured to change combustor pressure.

8. The combined cycle propulsion system of claim 1, further comprising a turbine positioned exterior of the mixing tube, wherein a portion of the air flow is bled to the turbine to remove a boundary layer in the engine inlet.

9. A method of operating the combined cycle propulsion system as claimed in claim 1, for propelling an aircraft, comprising:
generating a supersonic stream of high-temperature gas with a rocket ejector;
mixing the high-temperature gas with a flow of air received in an air inlet of the combined cycle propulsion system;
adjusting the mixture of the high-temperature gas with the flow of air by controlling a chamber pressure of the rocket ejector, thereby changing at least one condition of a combustor;
providing a rotating detonation rocket engine (RDRE) positioned exterior to an exhaust bell of the combustor to provide thrust at subsonic speeds and reduce a pressure at the exhaust bell of the combustor; and
propelling a vehicle.

10. The method of claim 9, wherein the vehicle further comprises an aircraft, whereby the at least one condition of the combustor is optimized changed based on at least one of: a trajectory of the aircraft, a flight condition of the aircraft, or a speed of the aircraft.

11. The method of claim 9, wherein mixing the high-temperature gas with the flow of air received in the engine inlet further comprises varying a cross section of a mixing tube where the high-temperature gas is mixed with the flow of air.

12. The method of claim 9, further comprising diffusing fuel into the flow of air with a diffusing surface positioned proximate to an inlet of the combustor, wherein the diffusing surfaces diffuse fuel into the air.

13. The method of claim 9, further comprising controlling combustor pressure with a variable throat connected to the combustor.

14. The method of claim 9, further comprising bleeding a portion of the flow of air to a turbine, thereby removing a boundary layer in the engine inlet.

15. The method of claim 14, further comprising:
cooling the portion of the flow of air with the turbine;
cooling at least one electronic device with the portion of the flow of air;
cooling the combustor with the portion of the flow of air; and
injecting the portion of the air into a bell expansion, thereby augmenting thrust.

16. The method of claim 9, whereby the at least one condition of the combustor is changed based on at least one of: a trajectory of the aircraft, a flight condition of the aircraft, or a speed of the aircraft.

17. The method of claim 9, wherein the adjusting mixing the high-temperature gas with the flow of air received in the air inlet further comprises varying a cross section of a mixing tube where the high-temperature gas is mixed with the flow of air.

18. The method of claim 9, further comprising diffusing fuel into the flow of air with a diffusing surface positioned proximate to an inlet of the combustor, wherein the diffusing surfaces diffuse fuel into the flow of air.

19. The method of claim 9, further comprising controlling combustor pressure with a variable throat connected to the combustor.

20. The combined cycle propulsion system of claim 1, wherein the jet engine comprises a ramjet engine or a scramjet engine.

* * * * *